Sept. 20, 1971 R. D. FORD 3,605,364
ANTI-SAG DEVICE FOR END SUPPORTED TUBULAR MEMBER
Filed April 4 1969 2 Sheets-Sheet 1
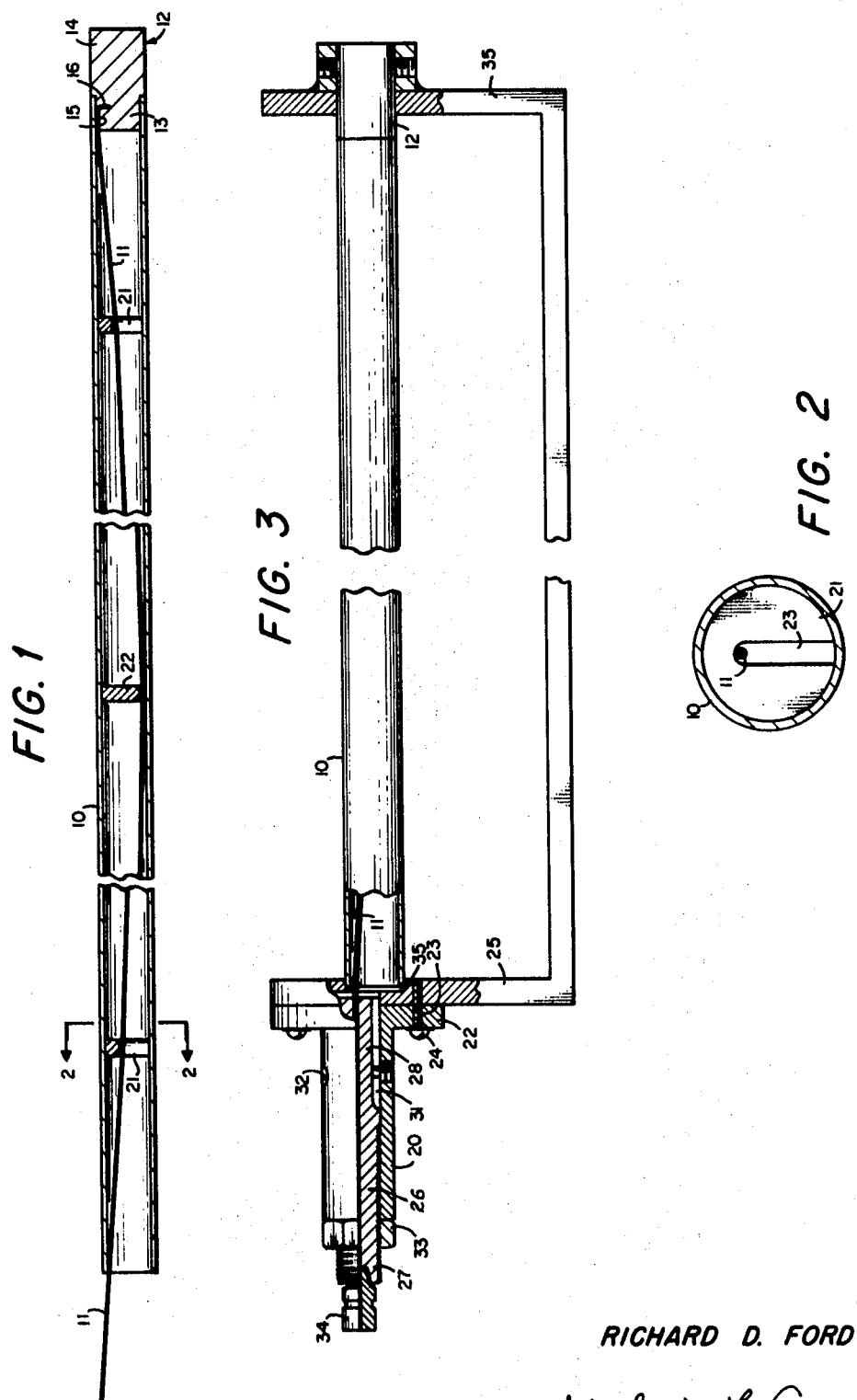
INVENTOR
RICHARD D. FORD
BY *Melvin L. Crane* AGENT
*R. Williams* ATTORNEY

United States Patent Office 3,605,364
Patented Sept. 20, 1971

3,605,364
ANTI-SAG DEVICE FOR END SUPPORTED TUBULAR MEMBER
Richard D. Ford, Temple Hills, Md., assignor to the United States of America as represented by the Secretary of the Navy
Filed Apr. 4, 1969, Ser. No. 813,448
Int. Cl. *E04c 3/10*
U.S. Cl. 52—291                        6 Claims

ABSTRACT OF THE DISCLOSURE

This disclosure is directed to a means for preventing sag in an end supported elongated tube by use of spaced wire guides within the tube and a strong cable or wire which passes through the tube and is tensioned sufficiently to prevent sag.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to tubular members and more particularly to a means for preventing sag in an end supported tubular member.

Heretofore, elongated tubular members have been used for various purposes, one such use has been in a plasma device as a conductor about which a magnetic field is produced. In order to carry out the intended result, it is imperative that the magnetic field be precise thereby requiring that the tubular member be uniform and with very little sag. The prior art devices have been found to sag as much as one-half inch over a ten foot length, therefore, a precise magnetic field could not be developed along the tube. Heretofore, anti-sag means have not been available to overcome this drawback.

SUMMARY OF THE INVENTION

This invention makes use of a cable or wire under tension with properly spaced spacers placed within an end supported tubular element to hold the tubular element on a horizontal line. The cable may have an insulation covering thereon or it may be insulated from the tubular member by use of the spacers and other insulating means, it desired, or necessary

STATEMENT OF THE OBJECTS

It is therefore an object of this invention to provide a means for preventing sag in an end supported elongated tubular member.

Another object is to provide a simple means which will withstand the forces of sag in an end supported tubular member to prevent same.

Still another object is to provide a tubuar sag prevention means which provides balanced electrical forces along a current conductive tubular member.

Other and more specific objects of this invention will become apparent upon a careful consideration of the following detailed description when taken together with the drawing.

BRIEF DESCRIPTION OF DRAWING

FIG. 1 illustrates a view of the sag prevention means shown in conjunction with a tubular element which is shown in cross-section.

FIG. 2 illustrates a cross-sectional view through one of the spacers.

FIG. 3 illustrates the device relative to a tensioning means.

DETAILED DESCRIPTION

Figure 4:
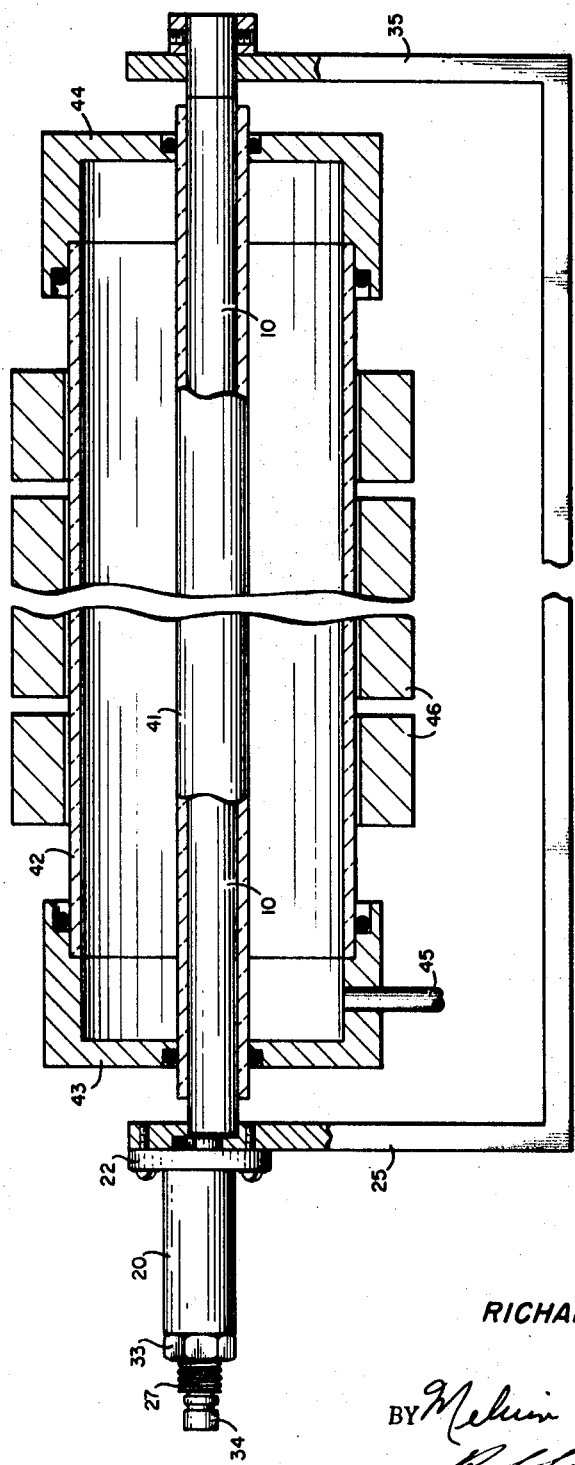
FIG. 4 illustrates the sag prevention means in use with a plasma device.

Now referring to the drawing, there is shown by illustration an elongated tubular member 10 which may be metal or any other material subject to sagging. As shown, a cable or wire 11 is secured at one end to a plug 12 which has one end portion 13 that extends into the end of the tubular member and a larger end 14 extending from the outer end of the tubular member. The inner end 13 has a diameter substantially equal the inner diameter of the tubular member to lock the cable between a groove 15 in the plug and the inner wall of the tubular member. The end of the wire is shown in a hole 16 perpendicular to the groove to prevent the wire from pulling out. The larger end of the plug is the same diameter as the tubular member, therefore, a shoulder 17 fits against the end of the tubular member and may be welded to the end to hold the plug in place against rotation.

The wire extends through the tubular member and is attached to a tensioning device which applies a tension on the wire. Wire guide spacers or inserts 21 and 22 are spaced along the length of the tubular member to force the wire away from the upper inner wall surface thereby force exerted axially along the steel wire is transferred to a vertical lift at each insert when the wire is under tension. The inserts are cylindrical so they will fit into the tubuar member and are provided with a cutout 23 as shown by FIG. 2. The cut out depth is proportional to position from the midpoint of the tubular member with the least cutout depth at the center of the tubular member and the cutout greater depth in the spacers nearer the ends of the tubular member. Since the midpoint of the tubular member will have a greater sag due to weight than near the ends, the centermost spacer 22 located at the midpoint forces the wire further away from the upper surface thereby producing a greater vertical lift at the center than nearer the ends. Thus, the vertical force on the tubular member will be such that the tubular member will be straight and without any sag.

The tensioning means may be any well known type or arrangement which will apply a tension on the cable to apply vertical force on the tube at the positions of the spacers with the vertical force opposite to the sag. Since the tube may sag considerably, the end at which the cable is secured to the plug is held in place while the tensioning means is tightened and the loose end of the tubular member will move toward the tensioning means as the tubular member is straightened. Once the tubular member is straight, the tube and cable are secured in place against movement. Thus, the tubular member will remain in place and in a substantially straight line without any sag.

A tensioning means representative of the type mentioned above is illustrated in FIG. 3 which illustrates a tube including a cable anti-sag means. As shown, the tensioning device includes an elongated cylindrical housing 20 including a flange end 22 which is provided with axially aligned apertures 23 through which bolts or screws 24 pass to secure the housing to a plate 25. A cylindrical member 26 is placed within the housing coaxial therewith. The cylindrical member has a threaded end 27 and a slotted end 28 which has a diameter slightly less than the inner diameter of the housing. The threaded end and the slotted end are separated by a shoulder which has an outer diameter substantially the same as the inner diameter of the housing for a sliding fit therein. The slots 31 are opposite to each other and receive therein the inner end of lock screws 32 which prevents the cylindrical member 26 from rotating and may be used to lock the cylindrical member in place. The threaded end extends beyond the outer end of the housing and a nut 33 is screw threaded thereon for applying a tension on the cable. A Swaglok connector 34 having a conical end fits into a conical end of the cylindrical member 26 and locks the end of the cable therein against axial motion relative to the Swaglok. The plate 25 has an aperture 35, therein which receives one end of the tubular member that is to be straightened against sag.

Since the cable must be at the upper surface of the tubular member at the ends, the tensioning device is secured to the plate off the center of the tubular member. Therefore, the tensioning device will be aligned such that the axis thereof is in alignmument with the inner-upper surface of the tubular member when the tubular member is in a horizontal position. Therefore, the tensioning device will apply a tension on the cable such that the tubular member will be substantially straight once sufficient tension has been applied to the cable.

In carrying out the invention, the tubular member which is to be supported near its end is provided with the spacers within the tube such that the cable secured at one end to the solid end plug and emerging from the opposite end is at an angle to the mid-point of the tube. That is, the ends of the cable are at the upper side of the tubular member and the cable at the mid-point is at the opposite or down side of the tubular member. Once the inserts are in place, the cable is threaded through the tube while supported in a horizontal position. The tubular member with the inserts and cable therein is positioned in place on the end supports 25 and 35 such that the cable lies in a vertical plane with the mid-point down. The open end of the tubular member is inserted into the aperture in the plate 25 for sliding motion therein and the plug end of the tubular member is secured against movement. With the cylindrical member in the tensioning device screw threaded forward with only a few threads extending outwardly of the nut, the end of the cable is extended through the cylindrical member within the tensioning device and is secured in the Swaglok. The Swaglok is then pressed into the outer end of the cylindrical member of the tensioning device. Thus, the cable is held at one end by the solid plug and at the other end by the Swaglok. Since the tubular member is supported near the ends, the tubular member will sag in the vertical plane along the axis. Tension is applied to the cable by rotation of the nut which feeds the cylindrical member outwardly while the cylindrical member is held against rotation by the lock screws in the slots. The plug end of the tubular member is held against movement; therefore, as the nut is rotated, greater tension is applied to the cable. As greater tension is applied to the cable, the cable applies a vertical force upwardly against the spacers. This upward force is against the sag, therefore, the tubular member is straightened. As the tubular member is straightened, the open end of the tubular member is permitted to move relative to the aperture within which it is guided. The lock screws may be threaded inwardly against the cylindrical member thereby aiding in holding the cylindrical member in place. The tubular member will be held in a horizontal position unless additional weight is added which will require the application of greater tension on the cable to hold the tubular member in a horizontal position.

An end supported metal tubular member may be used as a center conductor in a hot plasma device. Such a device is shown in an operative relationship with the central tubular member which is straightened by use of the teaching of this invention, as described above. As shown, a quartz tube 41 is placed around the tubular member and a much larger diameter quartz tube 42 is positioned coaxial therewith and held in place by end plates 43 and 44. The end plates are made vacuum tight relative to the two coaxial quartz tubes. One end is provided with a tubular connection 45 for evacuating the spacing between the two quartz tubes and for admitting a gas such as deuterium. Field coils 46 are provided for producing a magnetic field about the tube which confines the plasma to a region between the outer magnetic field and a magnetic field produced by a high current ($10^6$ amperes) through the inner tubular members. Such a device is well known in the prior art and for best results, it is imperative that the central tubular member be horizontal or straight. It has been determined that radial forces produced about the central tubular member are uneven due to sag thereby causing breakage. Thus, when the axis of the tubular member is on a horizontal, the forces are equal and breakage is prevented.

The tensioning device has been described as illustrative only wherein it will be obvious to others that other types of tensioning means may be used.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A support means for supporting a tubular member with its axis in a straight line thereby preventing sag in the tubular member; which comprises,
   a tubular member,
   guide means inserted in said tubular member in spaced relationship,
   a wire means extending through said tubular member through said spaced guide means,
   a wire anchoring means at one end of said tubular member for securing one end of said wire means against movement with the opposite end of said wire extending from the opposite open end of said tubular member,
   a tubular member support means for supporting said tubular member at each end thereof,
   said support means secured to said wire anchoring means at one end of said tubular means,
   said support means including an aperture therein for supporting the open end of said tubular member from which said wire extends,
   a wire tensioning means,
   said wire tensioning means secured to said support means in axial alignment with said aperture therein and said tubular means for applying a tension on said wire means extending from the end of said tubular means, whereby
   said wire tensioning means applies a force on said wire guide means in a direction opposite to any sag forces on said tubular member without applying any axial forces on the ends of said tubular member to prevent any sag in said tubular member.

2. A support means for preventing sag in a tubular member as claimed in claim 1; wherein, said guide means includes linearly spaced cylindrical means through which said wire means is extended.

3. A support means for preventing sag in a tubular member as claimed in claim 2; wherein, some of said linearly spaced cylindrical means include passages of equal diametrical openings therein through which said wire means is threaded.

4. A support means for preventing sag in a tubular member as claimed in claim 3; wherein, the passages in said linearly spaced cylindrical means are aligned in an axial plane through the tubular member.

5. A support means for preventing sag in a tubular member as claimed in claim 4; wherein, at least one of said linearly spaced cylindrical means is positioned at the mid-point along the length of said tubular member, the passage in the cylindrical guide means positioned at the mid-point through which said wire means passes, forces said wire means tangent to the inner surface of said tubular member, and the ends of said wire means in said tubular member are juxtaposed the inner end surfaces of said tubular member on the surface thereof opposite from said side surface to which the wire means at the mid-point is tangent.

6. A support means for preventing sag in a tubular member as claimed in claim 5; wherein, said wire means extends in substantially a straight line from each end of said tubular member to the mid-point of said tubular member.

References Cited

UNITED STATES PATENTS

| | | | |
|---|---|---|---|
| 865,488 | 9/1907 | Graham | 52—226 |
| 2,510,958 | 6/1950 | Coff | 52—225 |
| 3,011,844 | 12/1961 | Maha et al. | 52—225 |
| 3,014,857 | 12/1961 | Gow et al. | 313—161 |

FOREIGN PATENTS

| | | | |
|---|---|---|---|
| 485,184 | 9/1917 | France | 52—223 |
| 11,648 | 6/1899 | Great Britain | 52—223 |
| 117,344 | 7/1918 | Great Britain | 52—226 |

HENRY C. SUTHERLAND, Primary Examiner

U.S. Cl. X.R.

52—223, 720; 313—161